United States Patent [19]

Ueno et al.

[11] Patent Number: 5,516,538

[45] Date of Patent: May 14, 1996

[54] METHOD OF ADJUSTING THE POSITION OF A ROLLED-UP END IN CROISSANT DOUGH-PIECE BENDING FOLDING APPARATUS

[75] Inventors: Sadao Ueno; Hitoshi Kuwahara; Michio Morikawa, all of Utsunomiya, Japan

[73] Assignee: Rheon Automatic Machinery Co., Ltd., Tochigi, Japan

[21] Appl. No.: 319,113

[22] Filed: Oct. 6, 1994

[30] Foreign Application Priority Data

Oct. 15, 1993 [JP] Japan .................................. 5-281620

[51] Int. Cl.⁶ .............................. A21D 6/00; A21P 1/00
[52] U.S. Cl. .................... 426/231; 426/500; 426/502; 426/512
[58] Field of Search .................................. 426/231, 496, 426/500, 502, 512; 425/145

[56] References Cited

U.S. PATENT DOCUMENTS 5,354,571  10/1994  Morikawa et al. ..................... 426/502

*Primary Examiner*—George Yeung
*Attorney, Agent, or Firm*—Limbach & Limbach; W. Patrick Bengtsson

[57] ABSTRACT

The present invention is related to the method of positioning a rolled-up end of a fusiform croissant dough piece at a predetermined location of the dough piece when it is conveyed by a conveyor. The rolled-up end is sensed by a sensing means while the dough piece is rotated on the conveyor. Since the end is positioned at a predetermened location of the dough, at the underside of it, for instance, croissants of a uniform shape can be produced.

3 Claims, 4 Drawing Sheets

5,516,538

METHOD OF ADJUSTING THE POSITION OF A ROLLED-UP END IN CROISSANT DOUGH-PIECE BENDING FOLDING APPARATUS

DETAILED DESCRIPTION OF THE INVENTION

1. Industrial Field of the Invention

The present invention provides a method of adjusting or determining the position of a rolled-up end of a croissant dough piece, so that the dough piece is conveyed with the rolled-up end always at a certain position.

2. Prior Art

The inventors of the present invention searched prior art relating to the present invention, but they have not found so far any method or device that discloses a technology similar to the present invention.

PROBLEMS TO BE SOLVED BY THE INVENTION

In the prior art a croissant dough piece has been produced by randomly rolling up the dough sheet to obtain a fusiform dough body. In that croissant producing method, the position of the rolled-up end of the croissant dough piece is not determined. Thus the resultant croissants take irregular appearances. This is a problem that must be resolved when they are mass-produced, to produce products of a uniform shape.

THE MEANS TO RESOLVE THE PROBLEM

The present invention provides a method for positioning at a predetermined position the outer rolled-up end of a croissant dough piece based on novel means that have not been developed in the conventional art, to thereby obtain products of a uniform shape. Namely, according to the present invention a method of adjusting the position of the outer rolled-up end of a croissant dough piece comprises steps of conveying a rolled-up croissant dough piece by a conveyor, causing an engaging member provided on the conveyor to contact and roll the croissant dough piece, sensing the rolled-up end of the croissant dough piece by a sensor while it is being rolled, and disengaging the engaging member from the croissant dough piece based on the signal from the sensor.

EMBODIMENT

Figure 1:
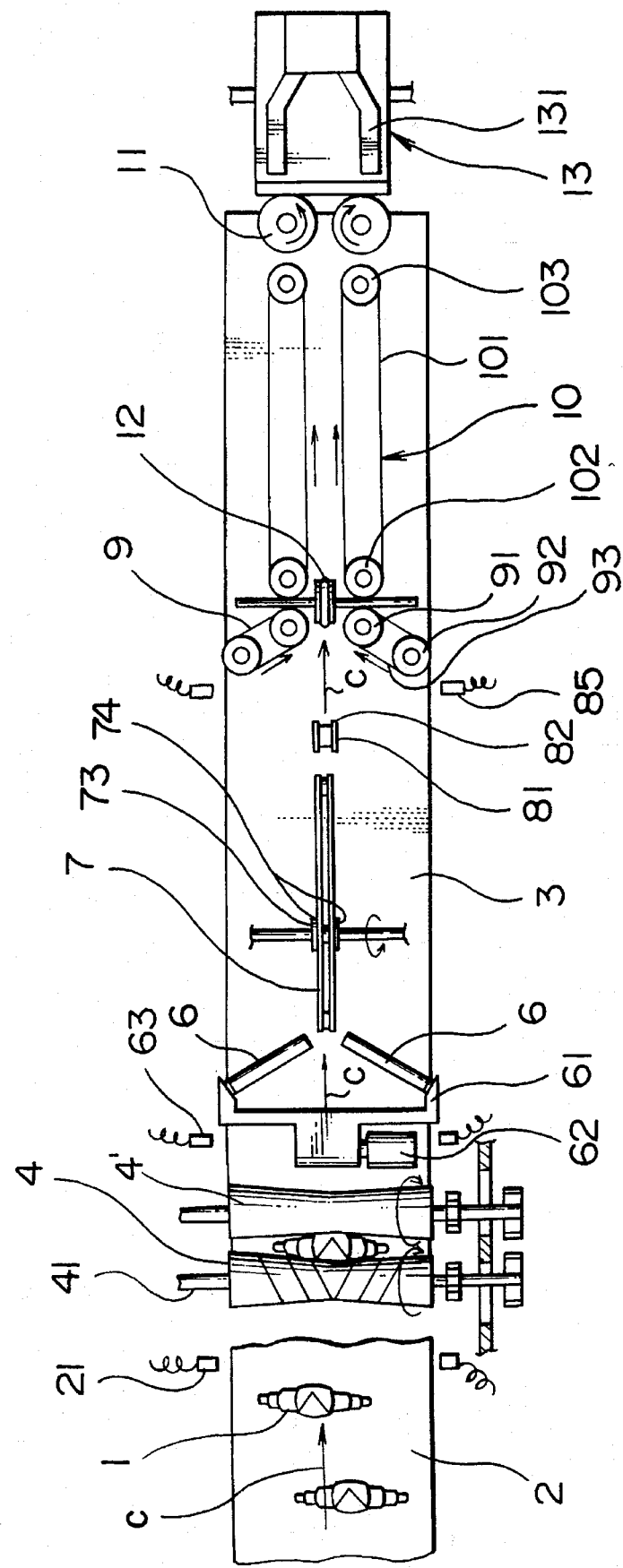
FIG. 1 is an overall plan view of a croissant dough-piece bending machine in which the method of the present invention is used.
Figure 2:
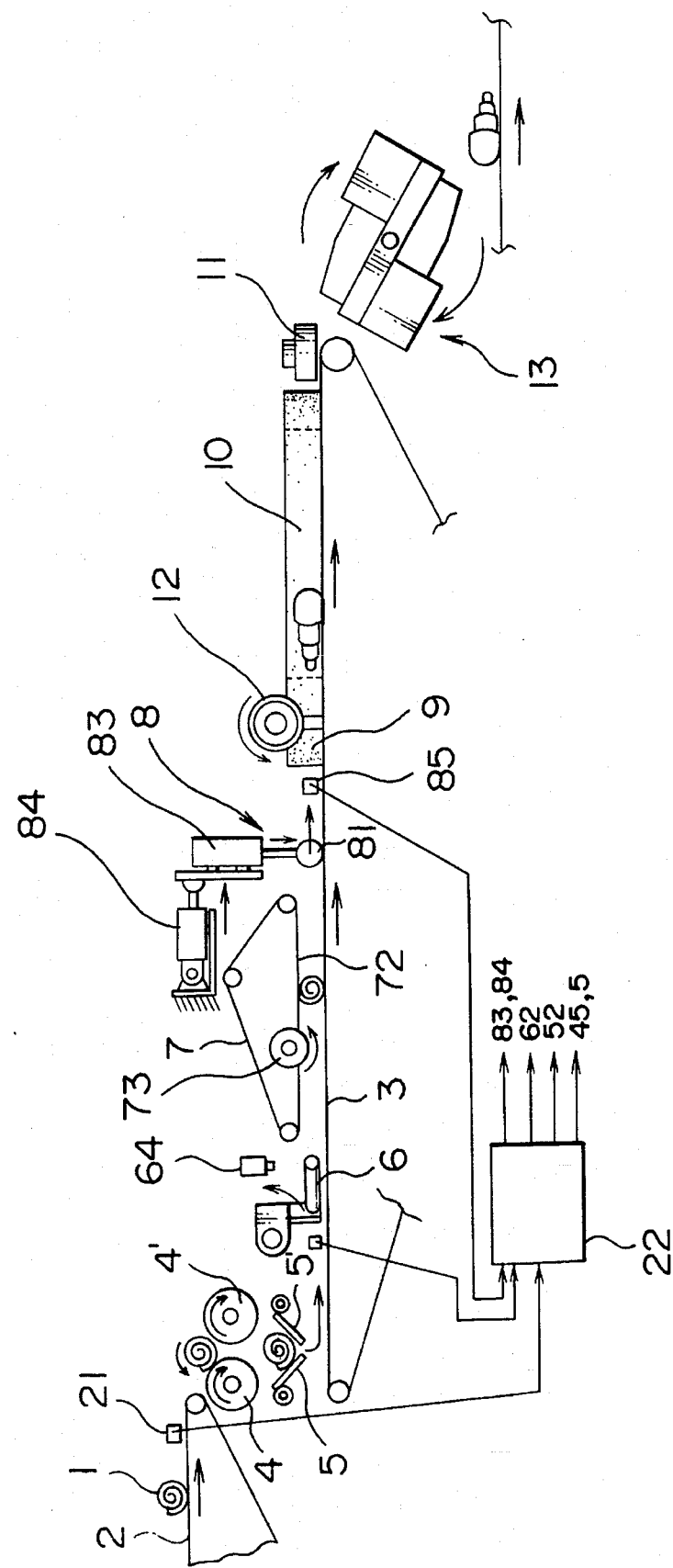
FIG. 2 is an overall side view of the machine of FIG. 1.
Figure 3:
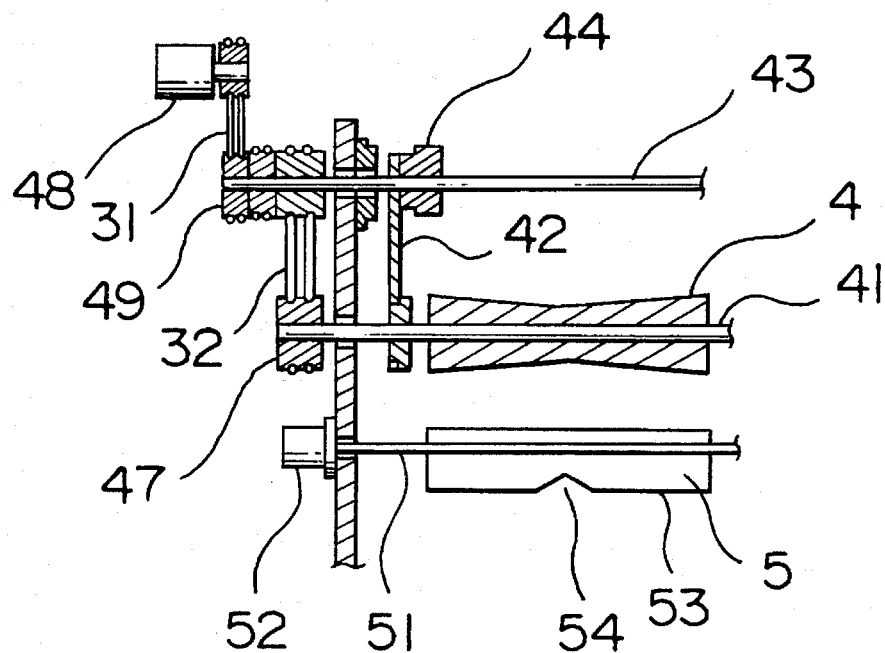
FIG. 3 is a front sectional view of the center aligning apparatus.
Figure 4:
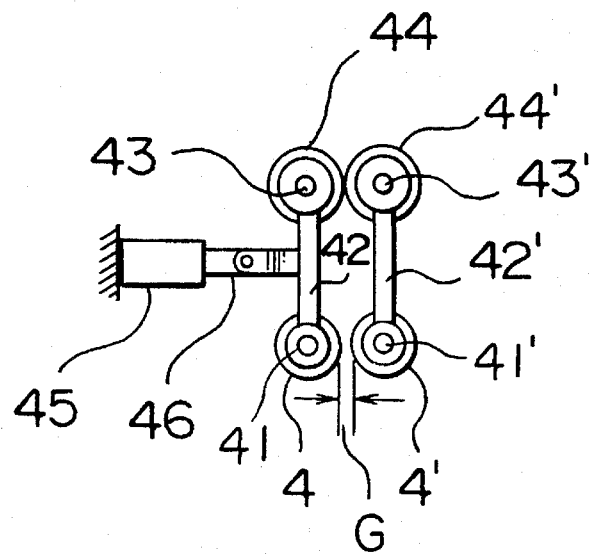
FIG. 4 is a partial side view of the apparatus of FIG. 3.
Figure 5:
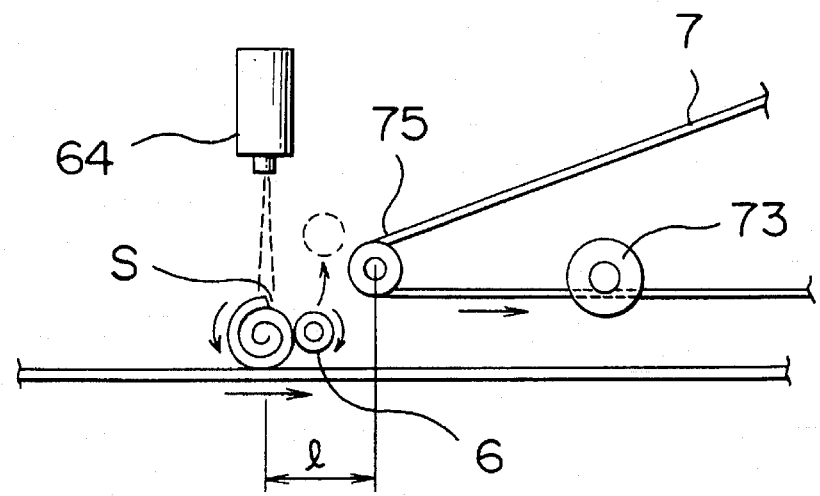
FIG. 5 is a side view of the rolled-up end sensing portion of the present invention.

An embodiment of the present invention will now be described in connection with a croissant-dough bending machine. The machine comprises an upstream conveyor 2 to convey rolled-up croissant dough piece 1 and a downstream conveyor 3 located downstream of and below the upstream conveyor 2.

A pair of concave rollers 4, 4' are located adjacent the upstream conveyor 2 and between the upstream conveyor 2 and the downstream conveyor 3. The concave rollers 4, 4' are positioned side by side with their axes positioned horizontally, and laterally to the direction of movement of the conveyor.

A pair of opposite planar shutters 5 is provided below and adjacent the concave rollers 4, 4'. The concave rollers 4, 4' and the shutters 5 form a center-aligning apparatus for aligning the central thick portion of the fusiform dough piece with the center line C of the downstream conveyor 3.

On the downstream conveyor 3 a pair of inclined rollers 6 is provided as an engaging member for the croissant dough piece 1. The upstream ends of the inclined rollers are positioned near the sides of the conveyor, and the downstream ends rollers approach each other, so that the rollers converge in the downstream direction. The inclined rollers and the conveying surface of the downstream conveyor are located parallel.

Also, the inclined rollers 6 freely rotate about the shaft of each of a pair of arms 61 extending from a member spaced apart from the conveyor 3 and rotatably connected to an actuator 62. The arms 61 swing upward as the actuator 62 is energized.

Photoelectric tubes 63 are located upstream of the inclined rollers 6. The photoelectric tubes 63 sense the croissant dough piece 1 that is supplied to the inclined rollers 6.

A laser sensor 64 is located above the center line C of the inclined rollers 6. This laser sensor 64 senses the rolled-up end S of the croissant dough piece when it reaches the inclined rollers and is rotated thereby.

When the laser sensor 64 senses the rolled-up end S, the inclined rollers 6 are swung upward by the actuator 62 that receives a signal from a control panel 22.

The swinging movement of the inclined rollers 6 is effected when a predetermined length of time lapses after the rolled-up end S is sensed by the laser 64.

Dough-piece holding belts 7 are provided adjacent and downstream of the inclined rollers 6.

The dough-piece holding belts 7 consist of two thin endless belts, which are trained in parallel relationship. The lower flights of the endless belts have a linear portion 72 that is in parallel with the conveying surface of the downstream conveyor 3. The upstream end 75 of the linear portion 72 is positioned adjacent the inclined rollers 6.

The dough piece holding belts 7 are moved by a driving device (not shown), so that the belts are moved at the same speed as the conveying speed of the downstream conveyor 3. At a downstream position of the holding belts 7 are provided a dough-piece bending member 8 and a pair of bending belts 9 to bend the croissant dough piece 1 at its center.

A pair of dough-piece gripping belts 10 is provided downstream of the bending belts 9. The dough piece of which the rolled-up end is positioned at the bottom thereof is thus discharged from the downstream conveyor 3 past a pair of gripping rollers 11.

FUNCTION

The function of the present invention will now be explained. A croissant dough piece 1 that was rolled up by a conventional rolling-up device is conveyed along the upstream conveyor 2. The croissant dough piece 1 is then delivered from the upstream conveyor to the downstream conveyor past the center-aligning apparatus.

The croissant dough piece 1 deposited on the downstream conveyor 3 is then engaged by the engaging member, i.e., inclined rollers 6, which freely rotate to roll the croissant dough piece 1. If the position of the dough piece is misaligned with the center line C, its position can be corrected by these rollers 6.

When the croissant dough piece 1 reaches the inclined rollers 6 and a signal from photoelectric tubes 63 indicative of the arrival of the subsequent dough piece is transmitted to the control panel 22, the laser sensor 64 begins to sense the rolled-up end S of the dough piece.

This sensing operation is carried out while the croissant dough piece 1 is rotated. The rolled-up end S is sensed as a difference of the thickness between the outer surface of the rolled-up end S and the layer below it and this signal is supplied to the control panel 22.

The control panel, after a predetermined lapse of time following the end S is sensed by the laser sensor 64, gives a signal to the actuator 62 so that the inclined rollers 6 are disengaged from the dough piece 1, namely, the rollers are swung upwardly, before the dough piece is conveyed downstream under the rollers. The rolled-up end is sensed several times while the dough piece is rotated in contact with the inclined rollers 6. However, to enhance the center-aligning effect of the dough piece by the rollers 6, the signal for the rolled-up end S is not transmitted to the actuator 62 before the subsequent dough piece 1 is sensed by the photoelectric tubes 63.

When the inclined rollers 6 are swung upward, the croissant dough piece 1 is conveyed downstream, and the rotating dough piece is soon caught by the upstream end 75 of the holding belts 7, so that the holding belts 7 stop the dough piece's rotation to thereby convey it downstream.

Figure 6:
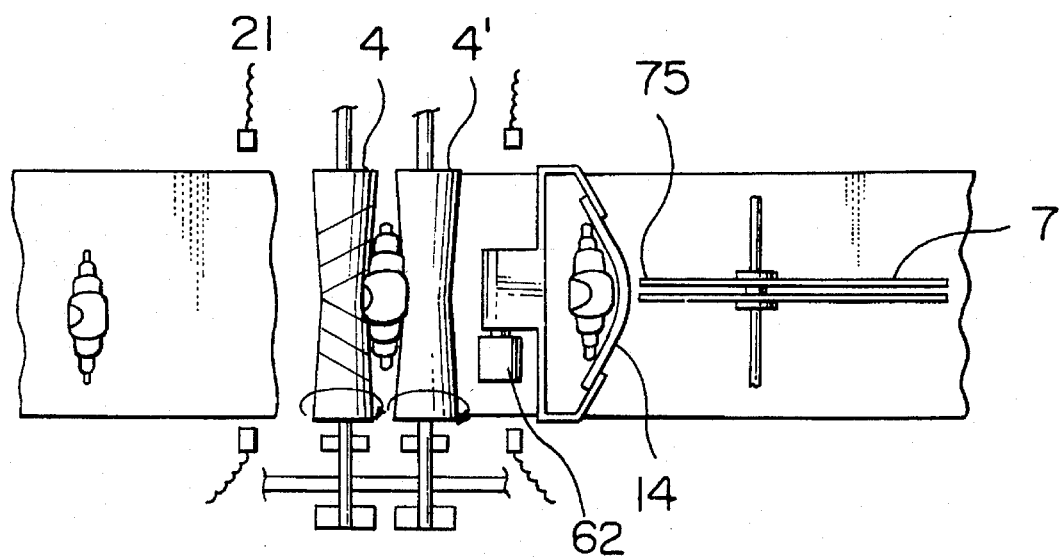
FIG. 6 is another embodiment of the portion of FIG. 5.

FIG. 6 shows another embodiment of the engaging member. In this embodiment, as opposed to the pair of freely-rotatable rollers 6, a curved dough-engaging plate 14 is used. It is connected to the arm 61 as in the previous embodiment, and so it can be swung upward. The engaging plate 14 is configured, when it is lowered to engage a dough piece, so as to hug the dough piece.

Although the engaging plate like this is not fully effective in aligning the center of the croissant dough piece, the plate substantially attains the effect and function of the present invention if the alignment has been fully carried out in the preceding stations.

The reason that the control panel 22 energizes the actuator 62 after a predetermined lapse of time (0.2 sec in this embodiment) from the time the panel 22 receives from the laser sensor 64 the signal for the rolled-up end S of the dough piece, is that, even after the rolled-up end S is sensed, the dough piece still rotates along the distance l, before it is caught by the upstream end 75 of the holding belts 7. The rolled-up end S, when it is engaged by the upstream end 75, must be located at the underside of the dough piece. The predetermined lapse of time of 0.2 sec is determined based on the amount of the dough piece's rotation.

By stopping the dough piece's rotation, the dough piece separated from the inclined rollers 6 can no more be rotated and thus cannot swerve from the center line C. The dough piece is conveyed downstream along the center line C by the holding belts 72, which move at the same speed as that of the downstream conveyor. Thus the dough piece is conveyed downstream without changing its orientation, because the dough piece is held between the belts 7 and the conveyor 3.

The dough piece thus conveyed reaches the bending belts past the bending member 8, and thereafter it is further carried downstream by a pair of gripping belts 10 to be discharged from the downstream conveyor.

Although it is explained in this embodiment that the position of the rolled-up end of the dough piece is always located at the bottom thereof, it is of course possible to change the position, when desired, by changing the sensing mode of the laser sensor 64 or by changing the distance between the dough piece positioned below the laser sensor 64 and the upstream end 75 of the holding belts 7.

EFFECT OF THE INVENTION

As explained above, according to the present invention, the center of the rolled-up croissant dough piece is aligned by a pair of inclined rollers and the rolled-up end of the dough piece is sensed so that the end is always uniformly positioned relative to the body of the dough piece. Thus the rolled-up end of the bent product always occupies the same position to provide products of the same shape. Therefore, it has become possible to obtain products of higher quality with higher productivity.

What is claimed is:

1. A method of adjusting a position of a rolled-up end of a croissant dough piece in a croissant dough piece bending apparatus comprising the steps of conveying a rolled-up croissant dough piece by a conveyor, adjusting the position of the dough piece by causing an engaging member provided on the conveyor to contact and roll the dough piece, sensing the rolled-up end of the dough piece by a sensor while it is being rolled, the sensor providing a signal, disengaging the engaging member from the dough piece based on the signal from the sensor, and bending the croissant dough piece.

2. A method of adjusting the position of a rolled-up end of a croissant dough piece in a croissant dough bending apparatus according to claim 1, wherein the engaging member consists of a pair of rollers that converge to each other in the downstream direction of the conveyor.

3. A method of adjusting the position of a rolled-up end of a croissant dough piece in a croissant dough bending apparatus according to claim 1, wherein the engaging member is an engaging plate that is configured, when it is positioned to engage a dough piece, so as to hug the dough piece.

* * * * *